United States Patent
Egami (10) Patent No.: US 7,124,010 B2
(45) Date of Patent: Oct. 17, 2006

(54) DRIVING ASSIST SYSTEM FOR VEHICLE

(75) Inventor: Masahiro Egami, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/366,530

(22) Filed: Feb. 14, 2003

(65) Prior Publication Data

US 2003/0163240 A1   Aug. 28, 2003

(30) Foreign Application Priority Data

Feb. 25, 2002   (JP)   ............................. 2002-048190

(51) Int. Cl.
   G06F 17/00   (2006.01)
(52) U.S. Cl. .......................................... 701/93; 701/96
(58) Field of Classification Search ................. 701/96, 701/1, 70, 78, 79, 93, 3, 13, 301, 45, 48; 180/176, 177, 274, 275, 170; 340/436, 466, 340/937, 903, 440, 407.1; 348/148
   See application file for complete search history.

(56) References Cited

U.S. PATENT DOCUMENTS

| | | | | |
|---|---|---|---|---|
| 4,628,317 A | | 12/1986 | Nishikawa et al. | |
| 4,730,686 A | * | 3/1988 | Shimizu | 180/446 |
| 4,754,829 A | * | 7/1988 | Shimizu | 180/446 |
| 5,033,770 A | * | 7/1991 | Kamimura et al. | 280/5.507 |
| 5,230,549 A | * | 7/1993 | Osada et al. | 303/3 |
| 5,473,539 A | * | 12/1995 | Shimizu et al. | 701/41 |
| 5,487,007 A | * | 1/1996 | Suzuki et al. | 701/44 |
| 5,508,919 A | * | 4/1996 | Suzuki et al. | 701/41 |
| 5,625,160 A | * | 4/1997 | Rudolf et al. | 89/36.17 |
| 5,667,033 A | * | 9/1997 | Shimizu et al. | 180/272 |
| 5,805,103 A | | 9/1998 | Doi et al. | |
| 5,991,678 A | * | 11/1999 | Gil | 701/51 |
| 6,024,420 A | * | 2/2000 | Yonemura et al. | 303/113.2 |
| 6,064,931 A | * | 5/2000 | Sawada et al. | 701/41 |
| 6,142,581 A | * | 11/2000 | Yamaguchi et al. | 303/113.2 |
| 6,158,824 A | * | 12/2000 | Yonemura et al. | 303/113.5 |
| 6,253,635 B1 | * | 7/2001 | Huber | 74/512 |
| 6,298,941 B1 | * | 10/2001 | Spadafora | 180/422 |
| 6,463,377 B1 | * | 10/2002 | Minowa et al. | 701/70 |
| 6,542,793 B1 | * | 4/2003 | Kojima et al. | 701/1 |
| 6,547,691 B1 | * | 4/2003 | Hino | 477/37 |
| 6,640,181 B1 | * | 10/2003 | Akabori et al. | 701/96 |
| 6,705,424 B1 | * | 3/2004 | Ogawa et al. | 180/446 |
| 6,882,915 B1 | * | 4/2005 | Yamamura et al. | 701/45 |
| 6,917,872 B1 | * | 7/2005 | Egami | 701/96 |
| 6,920,385 B1 | * | 7/2005 | Egami | 701/70 |
| 6,934,614 B1 | * | 8/2005 | Yamamura et al. | 701/45 |

(Continued)

FOREIGN PATENT DOCUMENTS

EP   49303 A   *   4/1982

(Continued)

*Primary Examiner*—Cuong Nguyen
(74) *Attorney, Agent, or Firm*—McDermott Will & Emery LLP (57) ABSTRACT

A vehicle driving assist system comprises a condition recognition device that detects a vehicle condition and a traveling environment around a subject vehicle; a reactive force application device that applies a reactive force, in conformance to the vehicle condition and the travelling environment around the subject vehicle, to an operation device; a condition change detection device that detects a condition change occurring around the subject vehicle; and a reactive force variation device that adjusts the reactive force applied by the reactive force application device in a period of time, when the condition change detection device detects that a condition around the subject vehicle has changed discontinuously.

25 Claims, 9 Drawing Sheets

U.S. PATENT DOCUMENTS

| | | |
|---|---|---|
| 6,981,486 B1 * | 1/2006 | Yone et al. .................. 123/399 |
| 6,997,075 B1 * | 2/2006 | Serebrennikov et al. ...... 74/339 |
| 2001/0008989 A1 * | 7/2001 | Minowa et al. ................ 701/96 |
| 2001/0029419 A1 * | 10/2001 | Matsumoto et al. ........... 701/80 |
| 2002/0029914 A1 * | 3/2002 | Schmidt ...................... 180/175 |
| 2003/0060936 A1 * | 3/2003 | Yamamura et al. ............. 701/1 |
| 2003/0094329 A1 * | 5/2003 | Ogawa et al. ............... 180/444 |
| 2003/0135317 A1 * | 7/2003 | Hijikata et al. ................ 701/70 |
| 2003/0163240 A1 * | 8/2003 | Egami ......................... 701/96 |
| 2004/0077457 A1 * | 4/2004 | Serebrennikov et al. ...... 477/34 |
| 2004/0225424 A1 * | 11/2004 | Yamamura et al. ........... 701/36 |
| 2005/0174223 A1 * | 8/2005 | Egami et al. ................. 340/440 |
| 2005/0187684 A1 * | 8/2005 | Hijikata et al. ................ 701/45 |
| 2005/0187713 A1 * | 8/2005 | Yamamura et al. ......... 701/301 |
| 2005/0273263 A1 * | 12/2005 | Egami et al. ................. 701/301 |
| 2005/0275520 A1 * | 12/2005 | Hijikata et al. .............. 340/466 |
| 2006/0116807 A1 * | 6/2006 | Hijikata ....................... 701/96 |

FOREIGN PATENT DOCUMENTS

| | | |
|---|---|---|
| EP | 1 327 552 A2 | 7/2003 |
| EP | 1338460 A2 * | 8/2003 |
| JP | 57-033048 | 2/1982 |
| JP | 01-092537 | 4/1989 |
| JP | 2-93134 | 7/1990 |
| JP | 03-217627 | 9/1991 |
| JP | 06-249956 | 9/1994 |
| JP | 10-166889 | 6/1998 |
| JP | 10-166890 | 6/1998 |
| JP | 2000-54860 | 2/2000 |
| JP | 2002-019485 | 1/2002 |
| JP | 2002-323930 | 11/2002 |
| JP | 2003246226 A * | 9/2003 |
| JP | 3573134 B2 * | 10/2004 |

* cited by examiner

DRIVING ASSIST SYSTEM FOR VEHICLE

BACKGROUND OF THE INVENTION

1. Field of the Invention

The present invention relates to a vehicle driving assist system that assists an operator to operate a vehicle, a method adopted in the vehicle driving assist system and a vehicle equipped with the system.

2. Description of the Related Art

Systems employed to assist an operator to operate a vehicle include that disclosed in Japanese Laid Open Patent Publication No. 2000-54860. This system adjusts the reactive force against an accelerator pedal operation based upon the distance between a preceding vehicle and the subject vehicle detected with a laser radar or the like while automatic cruise control is implemented in the subject vehicle. For instance, the accelerator pedal reactive force is set to heavy as a warning to the operator if the detected distance between the vehicles becomes smaller than a predetermined value, and the accelerator pedal reactive force is also set to a greater value during the automatic cruise control so as to allow the operator to rest his foot on the accelerator pedal.

SUMMARY OF THE INVENTION

However, the system described above does not enable the operator to verify whether or not any preceding vehicle has been detected without checking the monitor display or the like. In particular, if another vehicle cuts in between the subject vehicle and the preceding vehicle and thus the condition surrounding the subject vehicle changes in a discontinuous manner while the automatic cruise control is engaged, it is difficult for the operator to promptly determine which of the two vehicles, i.e., the cut-in vehicle (the vehicle that has just cut in front of the subject vehicle) or the initial preceding vehicle, is currently being detected by the automatic cruise control system and which vehicle is being targeted by the system.

A vehicle driving assist system according to the present invention comprises a condition recognition device that detects a vehicle condition and a traveling environment around a subject vehicle; a reactive force application device that applies a reactive force, in conformance to the vehicle condition and the travelling environment around the subject vehicle detected by the condition recognition device, to an operation device through which a travel command for the subject vehicle is issued; a condition change detection device that detects a condition change occurring around the subject vehicle based upon the vehicle condition and the traveling environment around the subject vehicle detected by the condition recognition device; and a reactive force variation device that adjusts the reactive force applied by the reactive force application device in a period of time, when the condition change detection device detects that a condition around the subject vehicle has changed discontinuously.

A vehicle driving assist system according to the present invention comprises a condition recognition means for detecting a vehicle condition and a traveling environment around a subject vehicle; a reactive force application means for applying a reactive force in conformance to the vehicle condition and the travelling environment around the subject vehicle detected by the condition recognition means to an operation means for issuing a travel command for the subject vehicle; a condition change detection means for detecting a condition change occurring around the subject vehicle based upon the vehicle condition and the traveling environment around the subject vehicle detected by the condition recognition means; and a reactive force variation means for adjusting the reactive force applied by the reactive force application means for a period of time, when the condition change detection means detects that a condition around the subject vehicle has changed discontinuously.

A vehicle driving assist method according to the present invention detects a vehicle condition and a traveling environment around a subject vehicle; applies a reactive force in conformance to the vehicle condition and the travelling environment around the subject vehicle to an operation device thorough which a travel command for the subject vehicle is issued; detects a condition change occurring around the subject vehicle based upon the vehicle condition and the traveling environment around the subject vehicle; and adjusts the reactive force applied to the operation device in a period of time, when it is detected that a condition around the subject vehicle has changed discontinuously.

A vehicle according to the present invention comprises an operation device through which a travel command for the vehicle is issued; a condition recognition device that detects a vehicle condition and a traveling environment around the vehicle; a reactive force application device that applies a reactive force to the operation device in conformance to the vehicle condition and the travelling environment around the vehicle detected by the condition recognition device; a condition change detection device that detects a condition change occurring around the vehicle based upon the vehicle condition and the traveling environment around the vehicle detected by the condition recognition device; and a reactive force variation device that adjusts the reactive force applied by the reactive force application device in a period of time, when the condition change detection device detects that a condition around the vehicle has changed discontinuously.

DESCRIPTION OF THE PREFERRED EMBODIMENTS

First Embodiment

The following is an explanation of the first embodiment of the vehicle driving assist system according to the present invention, given in reference to the drawings.

Figure 1:
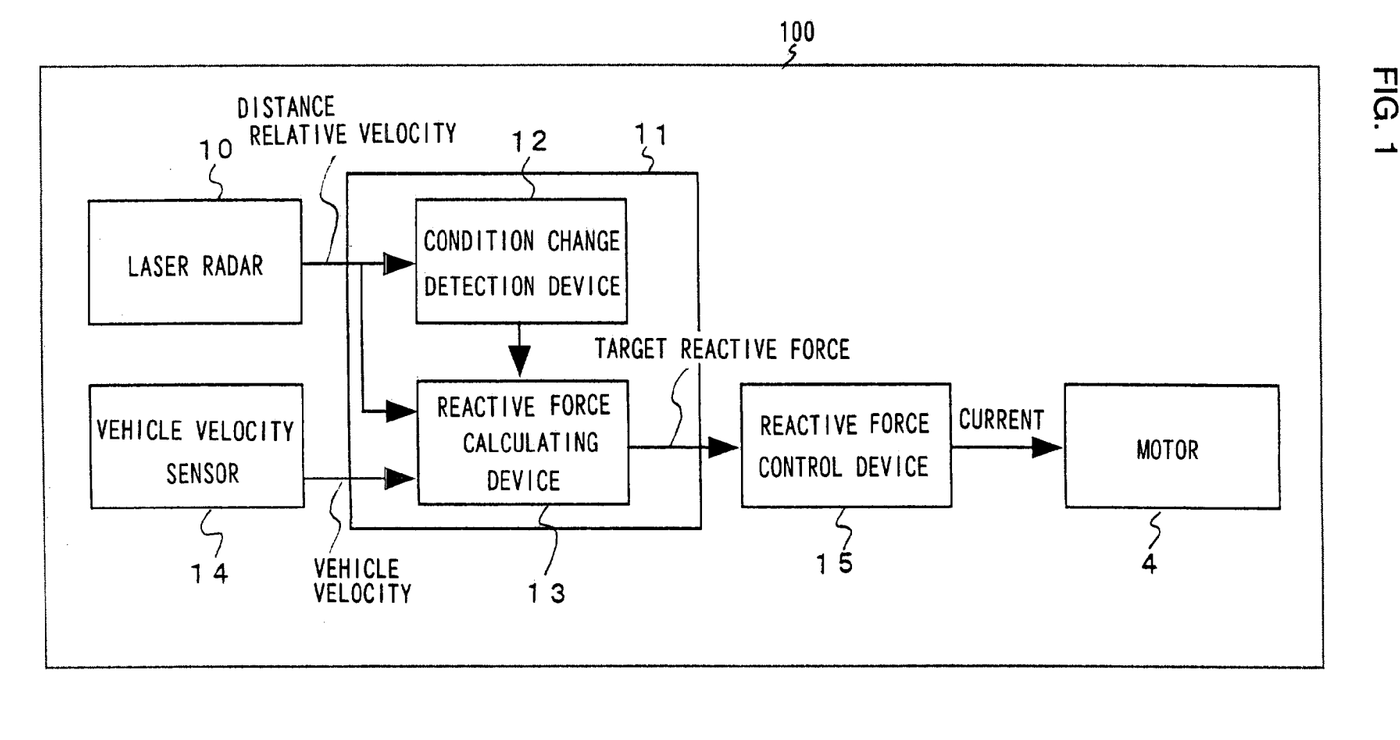
FIG. 1 is a system diagram showing the structure adopted in the vehicle driving assist system achieved in an embodiment of the present invention.
Figure 2:
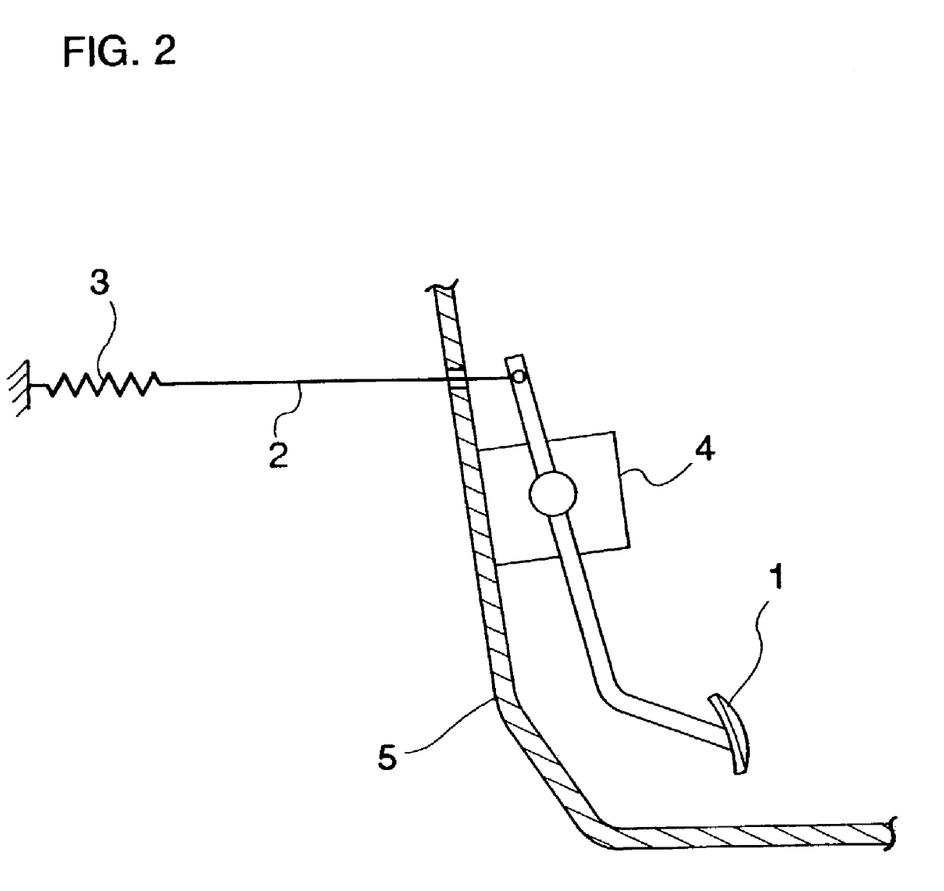
FIG. 2 shows the structure of the essential portion of the accelerator pedal used in the vehicle driving assist system in the embodiment of the present invention.
Figure 9:
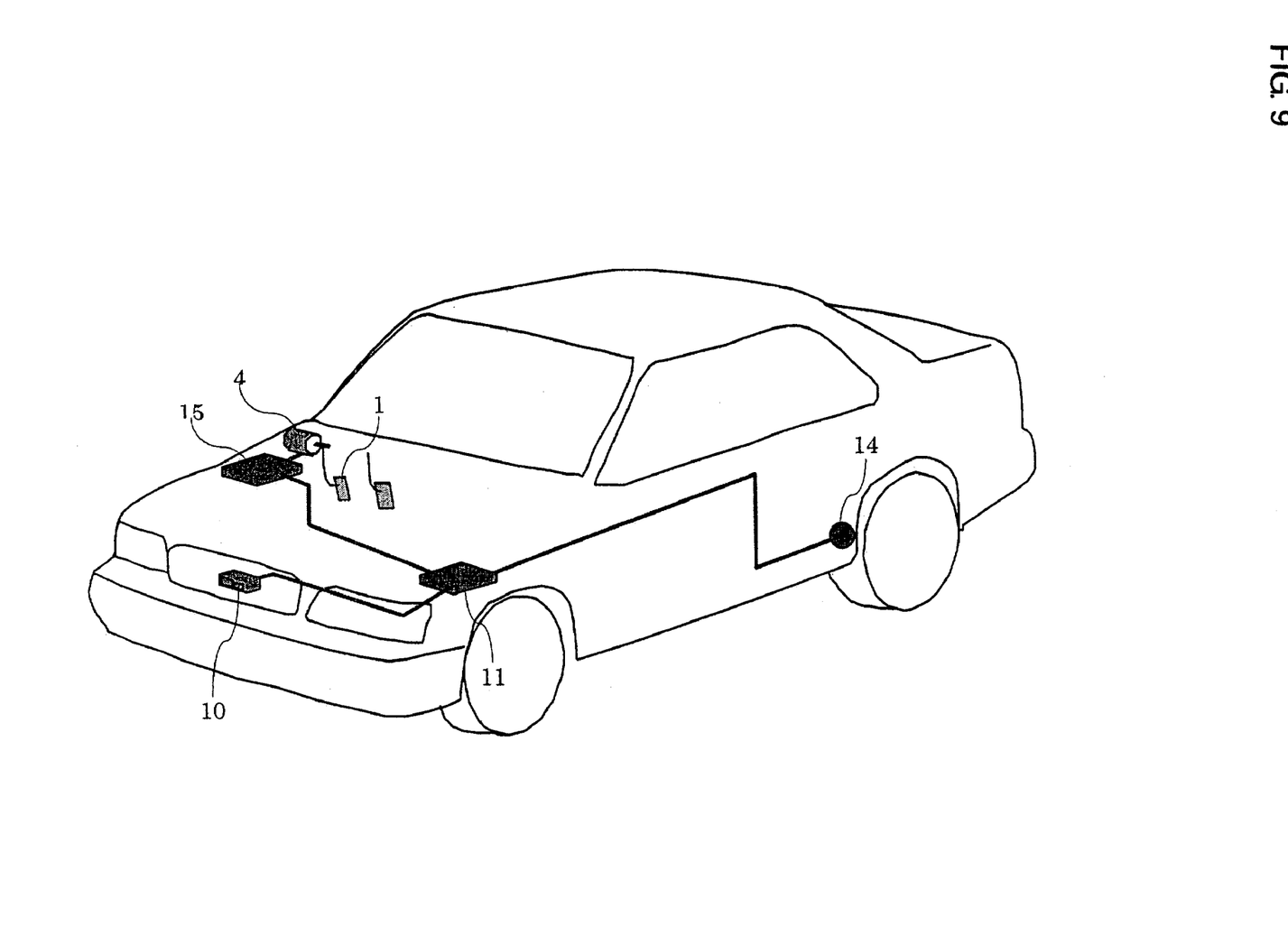
FIG. 9 shows the structure of a vehicle equipped with the vehicle driving assist system shown in FIG. 1.

FIG. 1 is a system diagram of the structure adopted in a vehicle driving assist system 100 achieved in the embodiment and FIG. 2 shows the structure of the essential portion of an accelerator pedal 1 employed in the driving assist system 100. FIG. 9 shows how the vehicle driving assist system 100 is installed in a vehicle. It is to be noted that the following explanation focuses on an example in which the vehicle driving assist system 100 is adopted in a so-called automatic vehicle tracking system in which the distance between vehicles is automatically controlled in conformance to the extent to which the accelerator pedal 1 is operated.

As shown in FIG. 2, the accelerator pedal 1 is supported by a spring 3 via a wire 2 and a servomotor 4 that is linked to the rotating shaft of the accelerator pedal 1. It is to be noted that reference numeral 5 indicates a body panel. Thus, a spring reactive force corresponding to the extent to which the pedal is operated is applied to the accelerator pedal 1 by the spring 3 and also a motor reactive force is applied to the accelerator pedal 1 by the servomotor 4. As explained later, the motor reactive force is controlled based upon the results of a preceding vehicle detection and it is controlled to remain at 0 if no preceding vehicle is detected.

As shown in FIGS. 1 and 9, the vehicle driving assist system 100 includes a laser radar 10 mounted at the front grille of the vehicle. The laser radar may be mounted to a front bumper of the vehicle. The laser radar is of a type which can scan horizontally and laterally about 6 degrees to each side of an axis parallel to the vehicle longitudinal centerline, by propagating infrared pulses forwardly and receiving the reflected radiation by an obstacle, such as a rear bumper of a preceding vehicle. The laser radar 10 provides a vehicle separation or a distance D between the subject vehicle and the preceding vehicle. It is to be noted that the vehicle distance D and the relative velocity ΔV are both 0 if no preceding vehicle is detected by the laser radar 10. A vehicle velocity sensor 14 detects the travelling speed of the subject vehicle based upon the rotation rate of the wheels or the like and outputs a detection signal to a controller 11.

The controller 11 comprises a CPU and CPU peripheral components such as a ROM and a RAM, and a condition change detection device 12 and a reactive force calculating device 13 are achieved in the form of software in the CPU.

The condition change detection device 12 detects a change occurring with regard to the condition surrounding the subject vehicle based upon the vehicle distance D and the relative velocity ΔV input from the laser radar 10. The condition change detection device 12 reads the signals input from the laser radar 10 every 100 μsec, for instance, and detects or determines that there is a condition change caused by another vehicle cutting in between the preceding vehicle and the subject vehicle if the difference between the current input values and the previous input values become equal to or greater than preset specific values (to be referred to as first predetermined values), i.e., if the vehicle distance D and the relative velocity ΔV change discontinuously. When the vehicle distance D and the relative velocity ΔV are both 0, i.e., when no preceding vehicle has been detected by the laser radar 10, the condition change detection device 12 determines that there is a condition change resulting from starting a preceding vehicle detection if the vehicle distance D and the relative velocity ΔV indicate a change by an extent equal to or exceeding the first predetermined value Da and ΔVa. When a preceding vehicle has already been detected, it determines a condition change resulting from stopping a preceding vehicle detection if the vehicle distance D and the relative velocity ΔV both become 0.

The condition change detection device 12 determines that there is no condition change while the vehicle distance D and the relative velocity ΔV vary continuously. It is to be noted that the first predetermined values Da and ΔVa regarding the vehicle distance D and the relative vehicle velocity ΔV are set in advance in appropriate manner.

The reactive force calculating device 13 calculates a target reactive force Fm+ΔFm as explained in detail later based upon the input signals provided by the laser radar 10, the vehicle velocity sensor 14 and the condition change detection device 12 and outputs a signal corresponding to the target reactive force to a reactive force control device 15.

The reactive force control device 15 outputs a control signal to the servomotor 4 so that the target reactive force Fm+ΔFm is applied to the accelerator pedal 1. As a result, the torque corresponding to the target reactive force is generated at the servomotor 4 and when the operator operates the accelerator pedal 1 he feels the motor reactive force generated by the servomotor 4 in addition to the spring reaction force generated by the spring 3.

Figure 3:
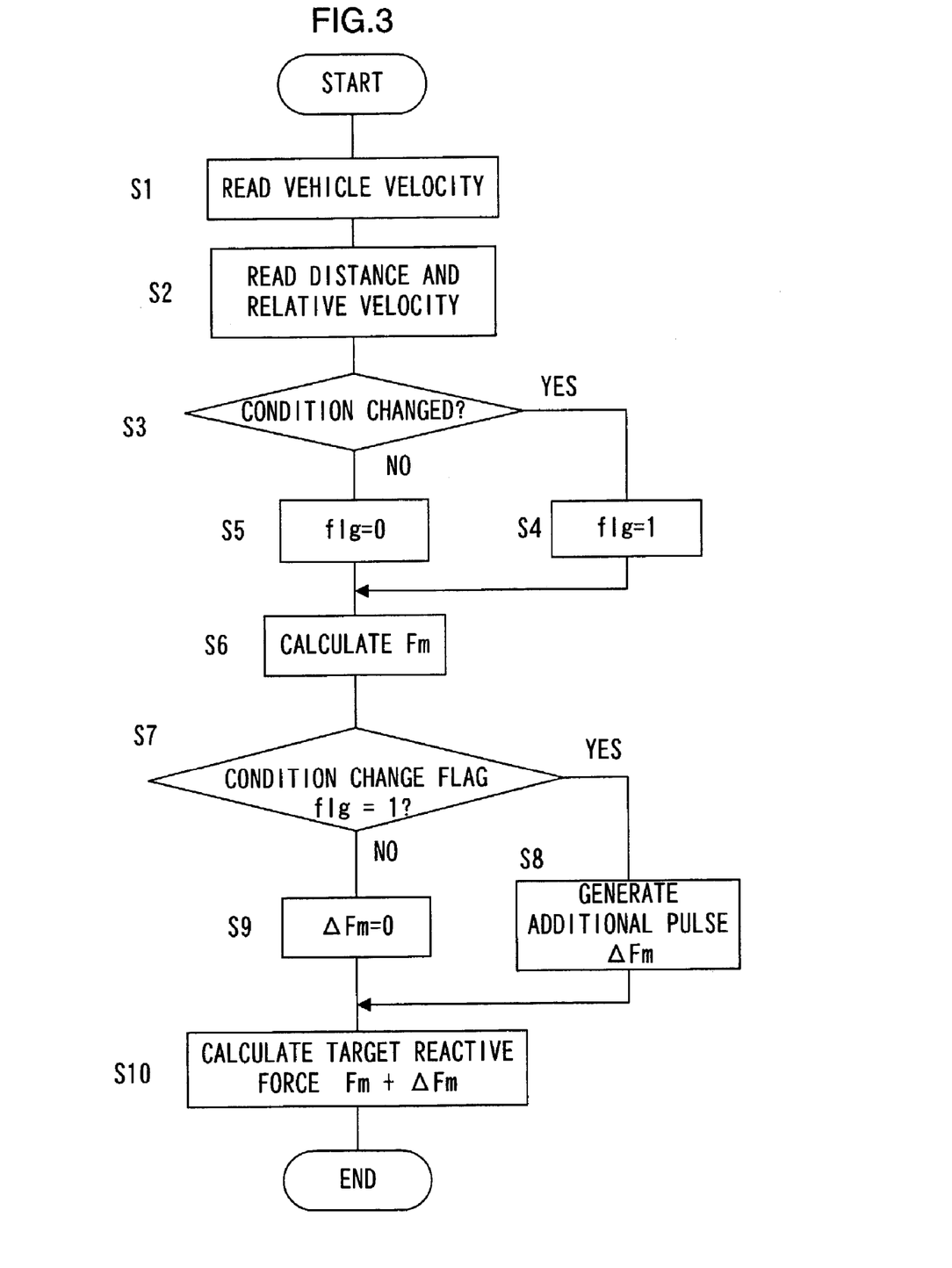
FIG. 3 presents a flowchart of an example of the processing executed in the controller constituting the vehicle driving assist system achieved in a first embodiment.

FIG. 3 presents a flowchart of an example of the processing procedure of the program executed by the controller 11 in the first embodiment. The processing in this flowchart, which may start in response to an ON operation of, for instance, a switch through which an automatic tracking operation start command is issued, is repeatedly executed over predetermined time intervals (e.g., every 100 μsec).

First, the subject vehicle velocity V detected by the vehicle velocity sensor 14 is read in step S1 and then the vehicle distance D and the relative velocity ΔV detected by the laser radar 10 are read in step S2. Next, in step S3, a decision is made as to whether or not any condition change has occurred in the environment around the vehicle based upon the vehicle distance D and the relative velocity ΔV. If it is decided that there is a condition change due to another vehicle cutting in between the preceding vehicle and the subject vehicle, a preceding vehicle detection start or a preceding vehicle detection stop, as described above, the operation proceeds to step S4. In step S4, a condition change flag "flg=1" is set. If, on the other hand, it is decided that there is no condition change, the operation proceeds to step S5 to output "the condition change flag flg=0".

Then, the operation proceeds to step S6 to calculate a target reactive force Fm in response to the vehicle condition and the traveling environment around the subject vehicle by using, for instance, the formula presented in expression (1) below.

$$Fm = \alpha(\Delta V/D + V/D) \text{ (when } Fm > 0\text{)} \quad (1)$$

In the expression above, α represents a constant and the relative velocity ΔV represents the absolute value (|V1−V|) of the difference between the velocities. In expression (1), the value obtained by dividing the relative velocity ΔV by the vehicle distance, which is a reciprocal of a time to contact TTC, represents a degree of proximity or closeness to the preceding vehicle from the subject vehicle. And the value obtained by dividing the subject vehicle velocity V by the vehicle distance D, which is a reciprocal of a time headway THW, represents a time required for the subject vehicle to reach the point that the preceding vehicle currently exists.

In expression (1), the target reactive force Fm increases as the distance D to the preceding vehicle becomes smaller and thus as the degree of the proximity to the preceding vehicle increases. It is to be noted that the target reactive force Fm is at 0 if no preceding vehicle is detected.

Next, the operation proceeds to step S7 to make a decision as to whether or not the condition change flag is currently set to 1. If it is decided that flg=1, the operation proceeds to step S8. In step S8, an additional pulse ΔFm is generated over a predetermined length of time Δt. The additional pulse ΔFm is a reactive force to be added to the target reactive force Fm calculated in step S8 and is set in advance to a value corresponding to the vehicle velocity V and the vehicle distance D. Here, the additional pulse ΔFm is set to ΔF0. If, on the other hand, it is decided in step S7 that flg=0, i.e., there is no condition change, the operation proceeds to step S9 to set 0 for the additional pulse ΔFm.

Then, in step S10, a total target reactive force (Fm+ΔFm) is calculated by adding the additional pulse ΔFm to the target reactive force Fm and a signal corresponding to the new target reactive force (Fm+ΔFm) is output to the reactive force control device 15. The reactive force control device 15 outputs a control signal corresponding to the target reactive force (Fm+ΔFm) to the servomotor 4, thereby controlling the torque of the servomotor 4. Consequently, a motor reactive force equivalent to the target reactive force (Fm+ΔFm) is applied to the accelerator pedal 1.

Next, the operations that characterize the vehicle driving assist system in the first embodiment are explained in detail.

(1) Preceding Vehicle Detection Start

FIGS. 4A~4E respectively show the operational characteristics varying along a time axis prior to and following a preceding vehicle detection, with regard to the vehicle distance D and the relative velocity ΔV, the condition change flag, the target reactive force Fm, the additional pulse ΔFm and the total target reactive force Fm+ΔFm.

Figure 4A:
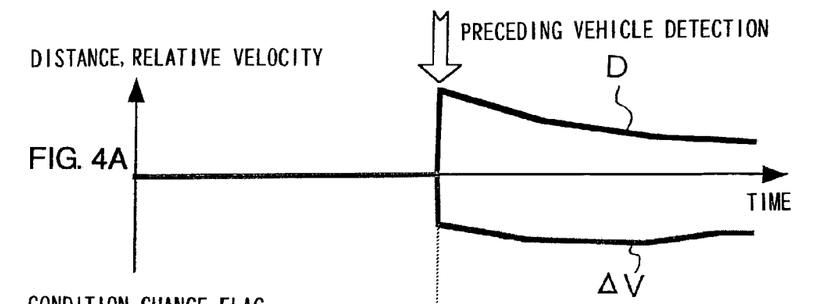
FIG. 4A shows the changes with regard to the distance between the vehicles and the relative velocity prior to and following a detection of a preceding vehicle along a time axis.
Figure 4B:
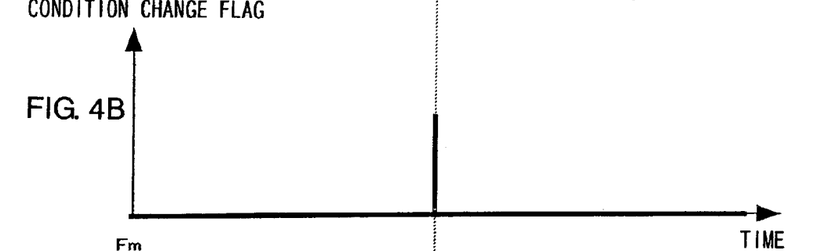
FIG. 4B shows the changes of the condition change flag prior to and following a detection of a preceding vehicle along a time axis.
Figure 4C:
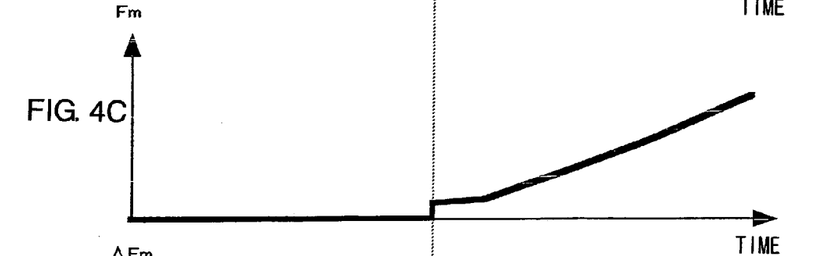
FIG. 4C shows the characteristics with regard to the target reactive force Fm prior to and following a detection of a preceding vehicle along a time axis.

Before a preceding vehicle is detected, the vehicle distance D, the relative velocity ΔV, the target reactive force Fm and the like are all set at 0. Accordingly, even when the vehicle is set in the automatic tracking mode, only the spring reactive force attributable to the spring 3 is applied to the accelerator pedal 1 in this state. Prior to the preceding vehicle detection, the vehicle does not engage in the automatic tracking operation and instead, the vehicle travels at the engine torque corresponding to the extent to which the accelerator pedal 1 is operated.

Figure 4D:
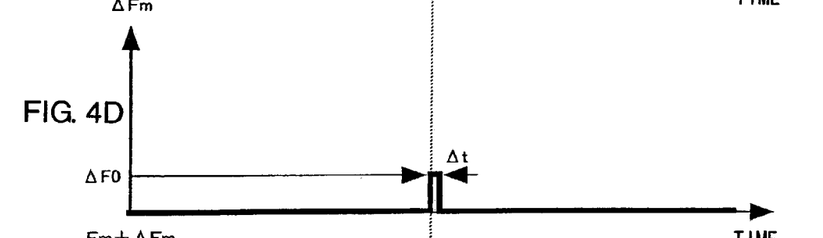
FIG. 4D shows the characteristics with regard to the additional pulse $\Delta Fm$ prior to and following a detection of a preceding vehicle along a time axis.

As the distance D to the preceding vehicle becomes small enough to enable the detection by the laser radar 10, the preceding vehicle detection starts (at a time point t1). As a result, the vehicle distance D rapidly (discontinuously) increases from 0 and the relative velocity ΔV rapidly (discontinuously) decreases from 0, as shown in FIG. 4A. Since the extents of the changes occurring in the vehicle distance D and the relative velocity ΔV are equal to or greater than the first predetermined values Da and ΔVa mentioned earlier, "condition change flag=1" indicating that there is the condition change in the surroundings around the subject vehicle is output as shown in FIG. 4B (step S4). Accordingly, the additional pulse ΔFm=ΔF0 is output over the predetermined length of time Δt, as shown in FIG. 4D (step S8).

Figure 4E:
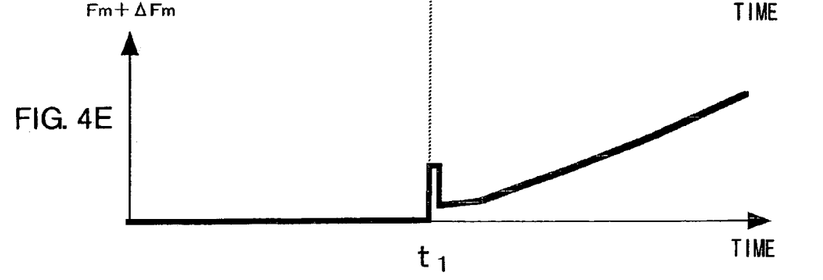
FIG. 4E shows the characteristics with regard to the total target reactive force $Fm+\Delta Fm$ prior to and following a detection of a preceding vehicle along a time axis.

In addition, after the preceding vehicle detection starts, the target reactive force Fm based upon the traveling environment is calculated (step S6), as shown in FIG. 4C. And the total target reactive force (Fm+ΔFm) calculated by adding the additional pulse ΔFm=ΔF0 to the target reactive force Fm is output to the reactive force control device 15 (step S10). As a result, the motor reactive force (Fm+ΔFm) shown in FIG. 4E is applied to the accelerator pedal 1, which rapidly increases the level of the motor reactive force at the preceding vehicle detection start. This rapid change in the motor reactive force (Fm+ΔFm) allows the operator to sense via the accelerator pedal 1 that a preceding vehicle detection has started.

In addition, since the target reactive force Fm increases gradually, after the additional pulse ΔFm=ΔF0 is applied, as the vehicle distance D and the relative velocity ΔV decrease as shown in the FIG. 4C, the operator is allowed to physically sense the change occurring in the vehicle distance D and the relative velocity ΔV via the accelerator pedal 1.

(2) Cut-In Vehicle Detection Start

FIGS. 5A~5E respectively show the operational characteristics varying along the time axis prior to and following a cut-in vehicle detection, with regard to the vehicle distance D and the relative velocity ΔV, the condition change flag, the target reactive force Fm, the additional pulse ΔFm and the total target reactive force Fm+ΔFm.

Figure 5A:
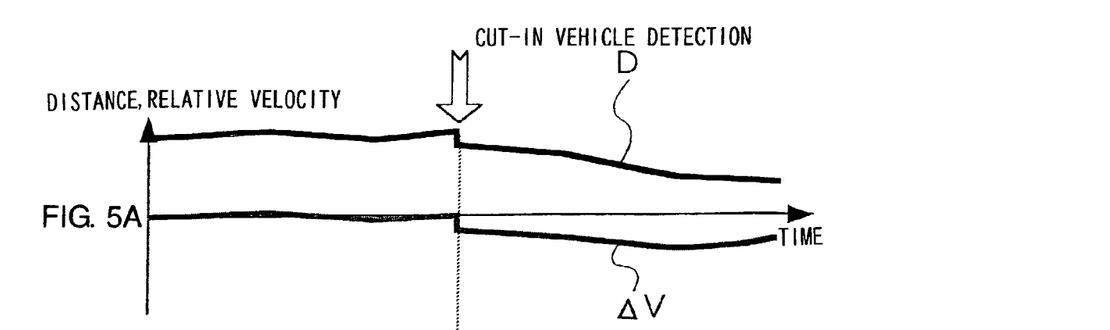
FIG. 5A shows the changes with regard to the distance between the vehicles and the relative velocity prior to and following a detection of a cut-in vehicle along a time axis.
Figure 5B:
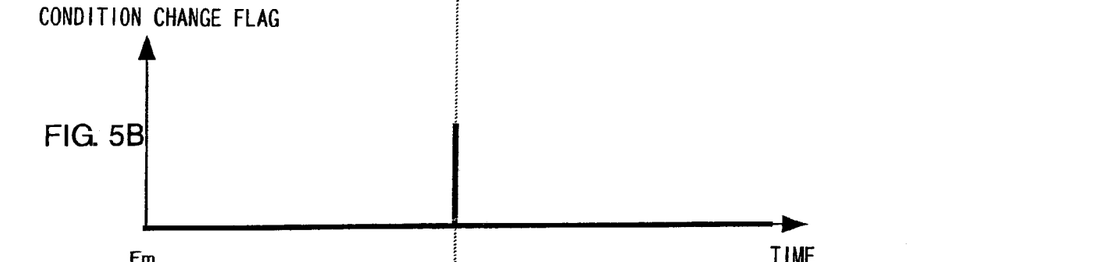
FIG. 5B shows the changes of the condition change flag prior to and following a detection of a cut-in vehicle along a time axis.
Figure 5C:
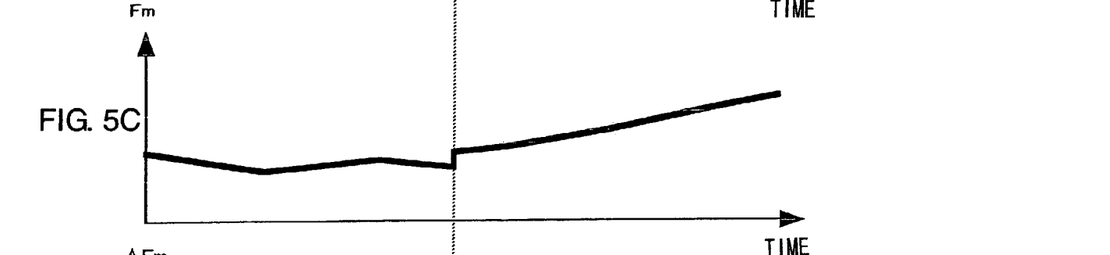
FIG. 5C shows the characteristics with regard to the target reactive force Fm prior to and following a detection of a cut-in vehicle along a time axis.

As shown in the FIG. 5A, the subject vehicle is engaged in a traveling operation by tracking the preceding vehicle while maintaining the vehicle distance D corresponding to the extent to which the accelerator pedal 1 is operated and maintains the relative velocity at 0 prior to a cut-in vehicle detection. During this period, the target reactive force Fm corresponding to the vehicle distance D, the vehicle velocity V and the relative velocity ΔV is applied to the accelerator pedal 1, as shown in FIG. 5C. The additional pulse ΔFm prior to the cut-in vehicle detection is 0.

As another vehicle cuts in between the subject vehicle and the preceding vehicle, the laser radar 10 switches the detection target for detecting the vehicle distance D and the relative velocity ΔV to the cut-in vehicle and detects the distance to and the speed relative to the new preceding vehicle (at the time point t1), thereby switching the object of the control implemented by the tracking control system.

Figure 5D:
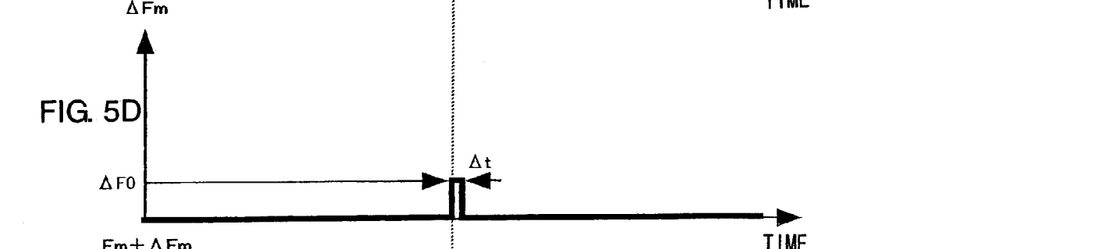
FIG. 5D shows the characteristics with regard to the additional pulse ΔFm prior to and following a detection of a cut-in vehicle along a time axis.
Figure 5E:
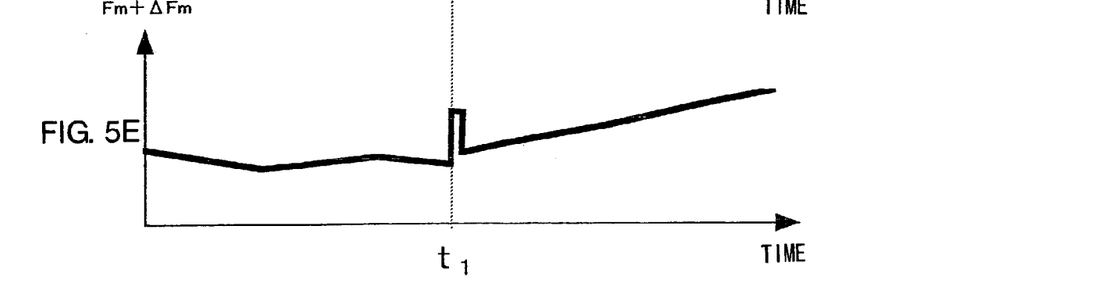
FIG. 5E shows the characteristics with regard to the total target reactive force Fm+ΔFm prior to and following a detection of a cut-in vehicle along a time axis.

As the new preceding vehicle (the cut-in vehicle) is detected, the vehicle distance D and the relative velocity ΔV change rapidly (discontinuously) as shown in FIG. 5A. The extent to which the vehicle distance D and the relative velocity ΔV change at this time is equal to or greater than the first predetermined values Da and ΔVa explained earlier and, in response, "condition change flag=1", indicating that there is a condition change, is output as shown in FIG. 5B (step S4). Accordingly, the additional pulse ΔFm=ΔF0 is output over the predetermined length of time Δt as shown in FIG. 5D (step S8), and the total target reactive force (Fm+ΔFm) which is obtained by adding the additional pulse ΔFm to the target reaction force Fm is output to the reactive force control device 15 (step S10). As a result, the motor reactive force (Fm+ΔFm) shown in FIG. 5E is applied to the accelerator pedal 1 so that the rapid increase in the motor reactive force at the time point t1 allows the operator to recognize that the detection of a cut-in vehicle has started.

It is to be noted that while the vehicle distance D and the relative velocity ΔV both increase if the preceding vehicle pulls out of the lane in which the subject vehicle is traveling, or the preceding vehicle moves to the adjacent lane, the rapid change in the vehicle distance D and the relative velocity ΔV occurring under these circumstances, too, results in a detection of a condition change. Consequently, the additional pulse ΔFm=ΔF0 is added to the motor reactive force Fm as in FIG. 5D to enable the operator to recognize a change in the detected condition.

The vehicle driving assist system 100 in the first embodiment of the present invention achieves the following advantages.

(1) The vehicle conditions and the traveling environment surrounding the vehicle, such as the vehicle distance D, the vehicle velocity V and the relative velocity ΔV, are detected with the vehicle velocity sensor 14 and the laser radar 10, a change in the condition around the vehicle is detected based upon the results of the detection performed by the vehicle velocity sensor 14 and the laser radar 10. And a larger motor reactive force (Fm+ΔFm) is applied to the accelerator pedal 1 over the predetermined length of time Δt upon detecting a condition change. Thus, the operator is easily able to recognize that the condition detected by the control system has changed discontinuously due to a condition change around the vehicle. (2) The system which detects the traveling environment around the vehicle based upon the vehicle distance D and the relative velocity ΔV is ideal in application in a vehicle which implements vehicle distance control.

(3) Since an additional reactive force is applied to the accelerator pedal 1 when a preceding vehicle is detected, the operator is always alerted of any change in the object of detection by the laser radar 10 through the accelerator pedal reactive force. As a result, the operator is able to perform a driving operations suited to the traveling environment.

Second Embodiment

Figure 6:
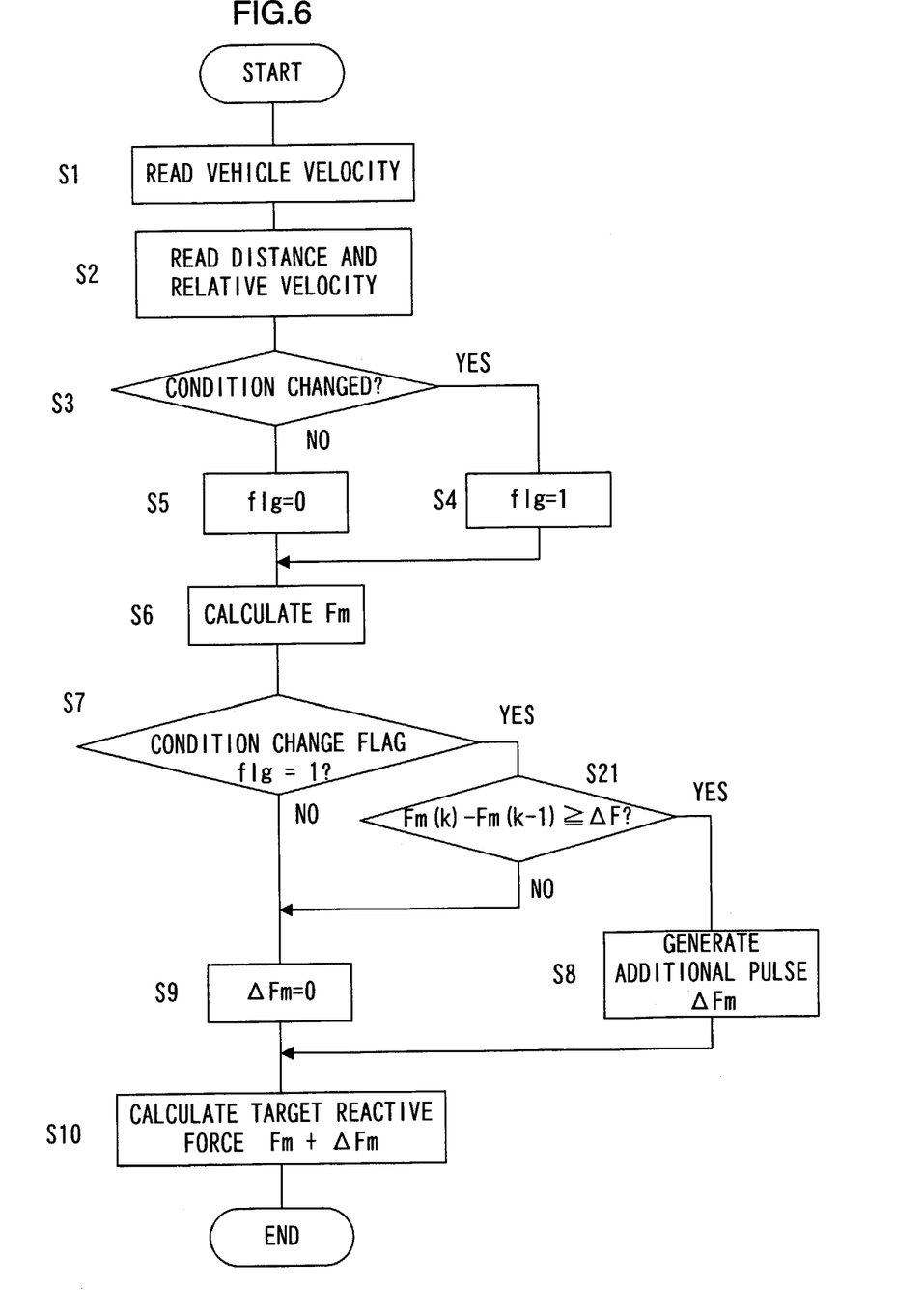
FIG. 6 presents a flowchart of an example of the processing executed in the controller constituting the vehicle driving assist system achieved in a second embodiment.

Now, in reference to FIG. 6, the second embodiment of the present invention is explained.

The contents of the processing executed by the controller 11 in the second embodiment is differentiated from the first embodiment. FIG. 6 presents a flowchart of an example of the processing procedure of the program executed by the controller 11 in the second embodiment. It is to be noted that in FIG. 6 the same step numbers are assigned to steps in which processing similar to that in FIG. 3 is executed and that the following explanation focuses on the difference from the processing shown in FIG. 3.

As shown in FIG. 6, after making a decision in step S7 that the condition change flag "flg=1", i.e., that a condition change has occurred, the operation proceeds to step S21. In step S21, the target reactive force Fm (k−1) previously calculated through an arithmetic operation immediately before the occurrence of the condition change is subtracted from the target reactive force Fm(k) calculated through the current arithmetic operation in step S6 immediately following the occurrence of the condition change. Then, a decision is made as to whether or not the difference (Fm(k)−Fm(k−1)) is equal to or greater than a preset specific value (to be referred to as a second specific value) ΔF. The second predetermined value ΔF may be set to equal to, for instance, the additional pulse ΔF0 used in the first embodiment.

If an affirmative decision is made in step S21, the operation proceeds to step S9 to set 0 to the additional pulse ΔFm. On the other hand, if a negative decision is made in step S21, the operation proceeds to step S8 to set ΔF0 to the additional pulse ΔFm. As a result, no additional pulse ΔFm is added if the extent (Fm(k)−Fm(k−1)) to which the target reactive force Fm has increased attributable to the occurrence of the condition change is equal to or greater than the second specific value ΔFm=ΔF0. And the additional pulse ΔFm is added only if the increase is smaller than the second predetermined value ΔF=ΔF0.

As explained above, the additional pulse ΔFm is added only if the extent (Fm(k)−Fm(k−1)) of the change in the target reactive force following the preceding vehicle detection relative to the target reactive force prior to the preceding vehicle detection is smaller than the second predetermined value ΔF in the second embodiment. Thus, the operator is able to recognize that a preceding vehicle has been detected. Furthermore, an application of an unnecessarily large motor reactive force to the accelerator pedal 1 is prevented to achieve better operability of the accelerator pedal 1 since no additional pulse ΔFm is added when the extent of the change in the target reactive force Fm attributable to the detection of the preceding vehicle.

Third Embodiment

Figure 7:
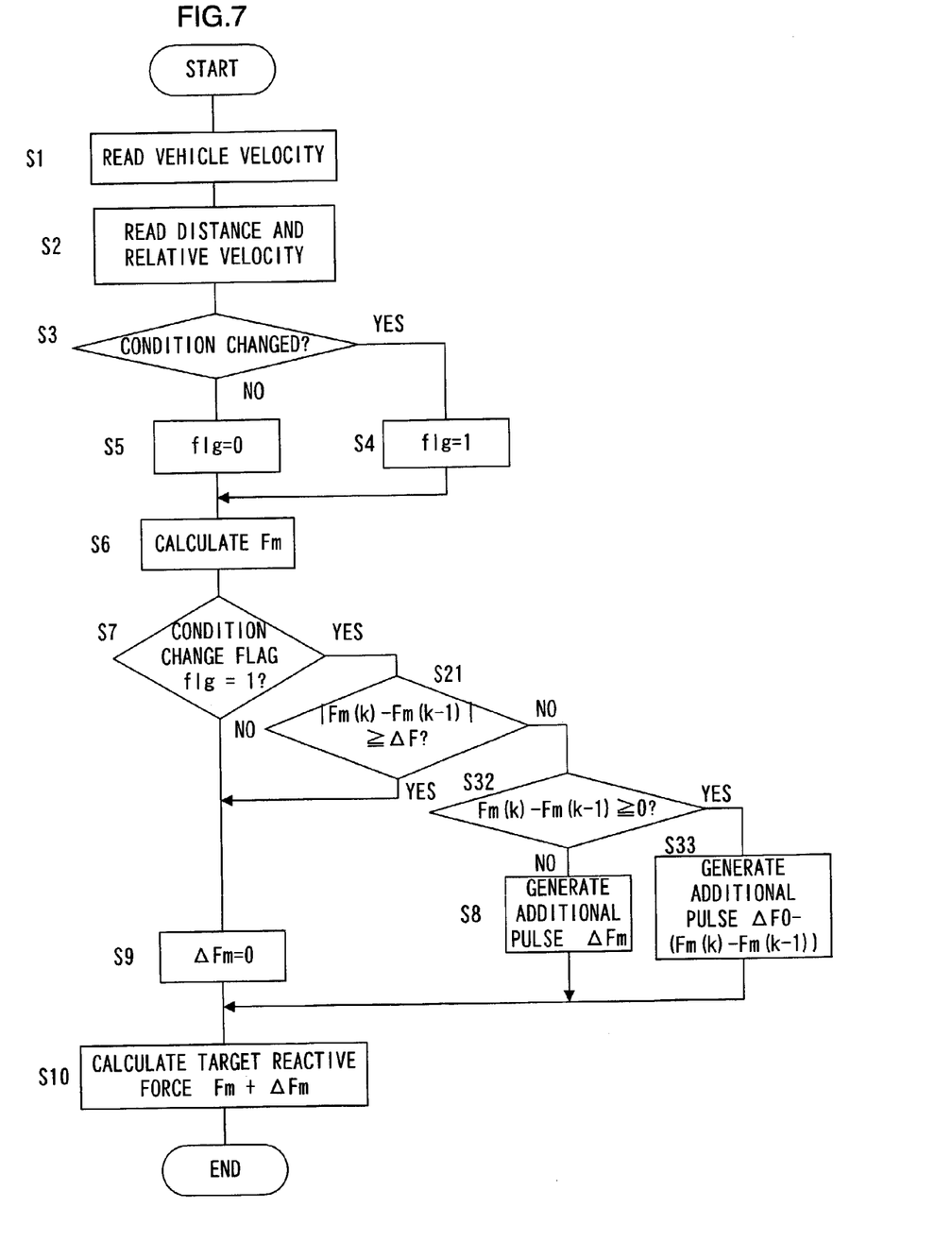
FIG. 7 presents a flowchart of an example of the processing executed in the controller constituting the vehicle driving assist system achieved in a third embodiment.

The third embodiment of the present invention is explained in reference to FIGS. 7 and 8.

The specific contents of the processing executed by the controller 11 differentiate the third embodiment from the first embodiment. FIG. 7 presents a flowchart of an example of the processing executed by the controller 11 in the third embodiment. It is to be noted that in FIG. 7 the same step numbers are assigned to steps in which processing identical to that in FIG. 3 is executed and that the following explanation focuses on the difference from the processing shown in FIG. 3.

As shown in FIG. 7, after making a decision in step S7 that the condition change flag "flg=1", i.e., that a condition change has occurred, the operation proceeds to step S31. In step S31, the target reactive force Fm(k−1) previously calculated through an arithmetic operation immediately before the occurrence of the condition change is subtracted from the target reactive force Fm(k) calculated through the current arithmetic operation in step S6 immediately following the occurrence of the condition change. Then, a decision is made as to whether or not the absolute value of the difference $|(Fm(k)-Fm(k-1))|$ is equal to or greater than the preset second specific value $\Delta F$. The second predetermined value $\Delta F$ may be set to equal to it, for instance, the additional pulse $\Delta F0$ used in the first embodiment. If an affirmative decision is made in step S31, the operation proceeds to step S9 to set 0 to the additional pulse $\Delta Fm$. On the other hand, if a negative decision is made in step S31, the operation proceeds to step S32.

In step S32, a decision is made as to whether or not the difference $(Fm(k)-Fm(k-1))$ obtained by subtracting the target reactive force $Fm(k-1)$ immediately before the occurrence of the condition change from the target reactive force $Fm(k)$ immediately after the occurrence of the condition change is equal to or greater than 0, i.e., the target reactive force $Fm(k)$ is equal to or greater than the target reactive force $Fm(k-1)$. If it is decided that the target reactive force $Fm(k)$ is equal to or greater than the value $Fm(k-1)$ ($Fm(k)>Fm(k-1)$), the operation proceeds to step S33, whereas if it is decided that the target reaction force $Fm(k)$ is smaller than the value $Fm(k-1)$ ($Fm(k)<Fm(k-1)$), the operation proceeds to step S8. In step S33, the value $(\Delta F0-(Fm(k)-Fm(k-1)))$ obtained by subtracting the difference between the reactive forces $Fm(k)$ and $Fm(k-1)$ from the predetermined additional pulse $\Delta F0$ is set for the additional pulse $\Delta Fm$ before the operation proceeds to step S10.

FIGS. 8A–8E respectively show the operational characteristics varying along the time axis prior to and following a cut-in vehicle detection, with regard to the vehicle distance D and the relative velocity $\Delta V$, the condition change flag, the target reactive force $Fm$, the additional pulse $\Delta Fm$ and the total target reactive force $Fm+\Delta Fm$.

As shown in FIGS. 8A–8D, as a cut-in vehicle is detected and the target reactive force $Fm(k)$ becomes larger than the target reactive force $Fm(k-1)$ at the time point t1, the additional pulse $\Delta Fm(=\Delta F0-(Fm(k)-(Fm(k-1))$ is output to over a predetermined length of time $\Delta t$ (step S33). As a result, the additional force $\Delta Fm$ added to the motor reactive force which is applied to the accelerator pedal 1 becomes constant at $\Delta F0$ regardless of the difference between the target reactive forces attributable to the detection of the cut-in vehicle, which makes it possible to minimize the increase in the reactive force to the minimal degree which is necessary to alert an operator.

Figure 8A:
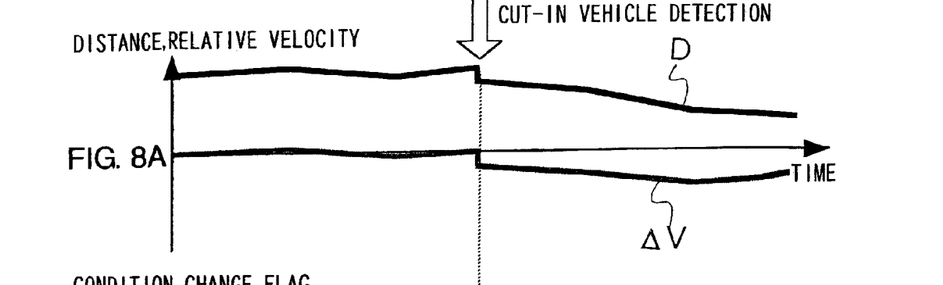
FIG. 8A shows the changes with regard to the distance between the vehicles and the relative velocity prior to and following a detection of a cut-in vehicle along a time axis.
Figure 8B:
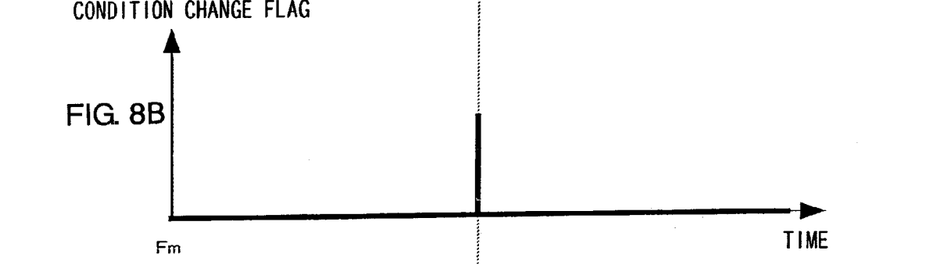
FIG. 8B shows the changes of the condition change flag prior to and following a detection of a cut-in vehicle along a time axis.
Figure 8C:
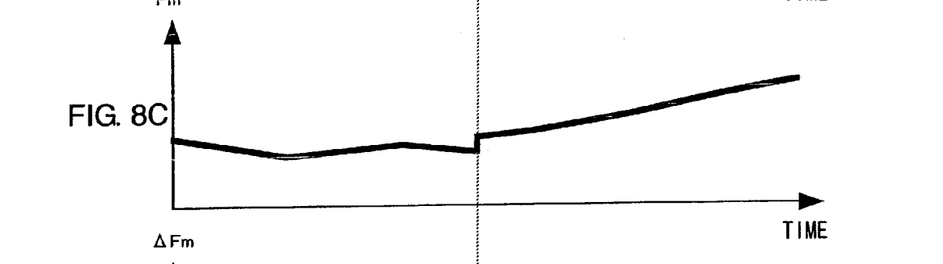
FIG. 8C shows the characteristics with regard to the target reactive force Fm prior to and following a detection of a cut-in vehicle along a time axis.
Figure 8D:
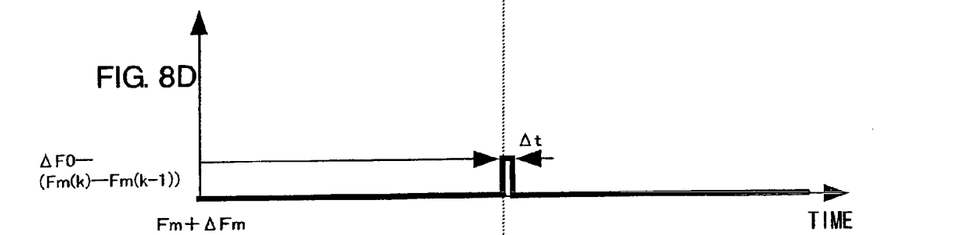
FIG. 8D shows the characteristics with regard to the additional pulse ΔFm prior to and following a detection of a cut-in vehicle along a time axis.
Figure 8E:
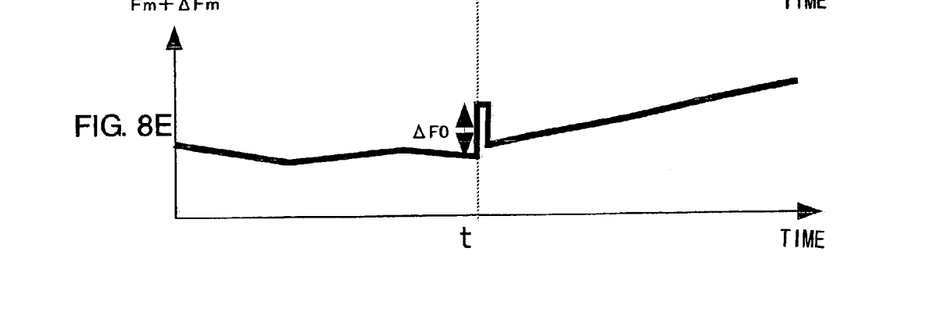
FIG. 8E shows the characteristics with regard to the total target reactive force Fm+ΔFm prior to and following a detection of a cut-in vehicle along a time axis.

If, on the other hand, the target reactive force $Fm(k)$ is smaller than the target reactive force $Fm(k-1)$, the additional pulse $\Delta F0$ is output over the predetermined length of time $\Delta t$ (step S8). In response, the motor reactive force changes rapidly to enable the operator to recognize that the detection of a cut-in vehicle has started. In this case, the difference between the value $(Fm+\Delta Fm)$ obtained by adding the additional pulse $\Delta Fm=\Delta F0$ to the target reactive force $Fm(k)$ after the occurrence of the condition change and the target reactive force $Fm(k-1)$ before the occurrence of the condition change becomes no greater than the specific value $\Delta F0$. Therefore, the amount of the change in the motor reactive force generated when the cut-in vehicle is detected, is always sustained equal to or smaller than the specific value $\Delta F0$.

As explained above, when the difference of the target reactive forces attributable to the detection of the condition change is smaller than the second predetermined value $\Delta Fm=\Delta F0$, the additional pulse $\Delta Fm$ corresponding to the difference $(F0-(Fm(k)-Fm(k-1)))$ is added. Accordingly, the motor reactive force is increased by a constant degree $\Delta F0$ when the condition change has occurred. Thus, it is possible to alert the operator that a cut-in vehicle detection has started while minimizing the increase in the motor reactive force.

It is to be noted that the vehicle driving assist system according to the present invention is not limited to the examples presented in the embodiments described above and allows for a number of variations. While the sum $(Fm+\Delta Fm)$ of the target reactive force $Fm$ and the additional pulse $\Delta Fm$ is output as the motor reactive force when the condition change has been detected in the embodiments described above, the difference $(Fm-\Delta Fm)$ obtained by subtracting the additional pulse $\Delta Fm$ from the target reactive force $Fm$ may instead be output as the motor reactive force. In this case, too, the operator is easily able to recognize that a preceding vehicle detection has started through a rapid change in the motor reactive force.

In the embodiments described above, the target reactive force $Fm$ is calculated by using a reciprocal $(\Delta V/D)$ of the time to contact and a reciprocal $(V/D)$ of the time headway, however, the present invention is not limited to this example. The target reactive force $Fm$ may be calculated, for instance, by using only the reciprocal $(\Delta V/D)$ of the time to contact.

While the reactive force $\Delta Fm$ with a pulse waveform is added at the preceding vehicle detection start, the waveform of the reactive force $\Delta Fm$ is not limited to this example. For instance, the reactive force $\Delta Fm$ may be gradually increased or gradually reduced. Instead of continuously applying the additional reactive force $\Delta Fm$ over the predetermined length of time $\Delta t$, the additional reactive force $\Delta Fm$ may be repeatedly applied during the predetermined period of time $\Delta t$. In other words, a reactive force $\Delta Fm$ with a high frequency waveform may be added. Thus, in the vehicle driving system according to the present invention, any additional force $\Delta F$ may be added, as long as the reactive force applied to the accelerator pedal 1 is adjusted in a period of time when the condition change around the subject vehicle has been detected so that the operator is able to ascertain the condition change around the vehicle via the accelerator pedal 1.

An explanation is given above in reference to the embodiments in which the system according to the present invention is adopted in a vehicle with an automatic tracking system that automatically controls the vehicle distance in conformance to the extent to which the accelerator pedal 1 is operated. However, the present invention is not limited to this example, and the system may be adopted in a vehicle that does not implement vehicle distance control as long as accelerator pedal reactive force control is implemented based upon the traveling environment around the subject vehicle and the operator is easily able to recognize a condition change occurring around the vehicle as a change in the accelerator pedal reactive force. In addition, while an automatic tracking operation start command is issued through a switch operation, the vehicle distance control may be started or cleared in conformance to, for instance, the stroke quantity of the accelerator pedal 1.

It is to be noted that the laser radar 10 in the embodiments described above may be a radar adopting another detection method such as a milliwave radar. The operation device, which is used to issue a travel command for the vehicle may be a member other than the accelerator pedal 1, such as a brake pedal. While a preceding vehicle is detected with the laser radar 10, an object other than a preceding vehicle may be detected. In addition, the servomotor 4 is employed to apply the reactive force, the reactive force may be applied with another actuator. While a single servomotor 4 is used to generate the target reactive force $Fm$ and the additional reactive force ΔFm, the target reactive force Fm and the additional reactive force ΔFm may be generated by separate actuators, as well.

The above described embodiments are examples and various modifications can be made without departing from the spirit and scope of the invention.

The disclosure of the following priority application is herein incorporated by reference:

Japanese Patent Application No. 2002-048190 filed Feb. 25, 2002

What is claimed is:

1. A vehicle driving assist system comprising:
a condition recognition device that detects and a traveling environment that is external to and around a subject vehicle;
a reactive force application device that applies a reactive force, in conformance to the traveling environment, to a driver of the subject vehicle via an operation device through which a travel command for operating the subject vehicle is issued by the driver;
a condition change detection device that detects condition changes occurring in the traveling environment; and
a reactive force variation device that adjusts the reactive force applied by the reactive force application device in a period of time, when the condition change detection device detects a condition change in the traveling environment that is discontinuous, the discontinuous condition change being an introduction of an obstacle into the traveling environment.

2. The vehicle driving assist system according to claim 1, wherein:
the reactive force variation device adjusts the reactive force applied by the reactive force application device in pulse shape.

3. The vehicle driving assist system according to claim 1, wherein:
the reactive force variation device adjusts the reactive force applied by the reactive force application device so that the reactive force is allowed to change at a constant degree when the condition change detection device detects a condition change in the traveling environment that is discontinuous.

4. The vehicle driving assist system according to claim 1, wherein:
the condition recognition device detects a relative velocity and distance between the subject vehicle and a preceding vehicle as the traveling environment, and
the condition change detection device determines whether the condition change in the traveling environment is discontinuous based upon the relative velocity and the vehicle distance detected by the condition recognition device.

5. The vehicle driving assist system according to claim 1, wherein:
the reactive force application device calculates a target reactive force to be applied to the operation device based upon the traveling environment around the subject vehicle, and
the reactive force variation device adds an additional force to the target reactive force if a change of the target reactive force due to the condition change is smaller than a predetermined value, when the condition change detection device detects a condition change in the traveling environment that is discontinuous.

6. The vehicle driving assist system according to claim 1, wherein:

the reactive force application device calculates a target reactive force to be applied to the operation device based upon the traveling environment, and
the reactive force variation device adds an additional force for regulating a change of the reactive force applied to the operation device at a constant degree, to the target reactive force if a change of the target reactive force due to the condition change is smaller than a predetermined value and the target reactive force after the condition change is greater than the target reactive force before the condition change, when the condition change detection device detects a condition change in the traveling environment.

7. The vehicle driving assist system according to claim 5, wherein:
the reactive force variation device sets substantially 0 to the additional force when the change of the target force due to the condition change is equal to or greater than the predetermined value.

8. The vehicle driving assist system according to claim 6, wherein:
the reactive force variation device sets substantially 0 to the additional force when the change of the target force due to the condition change is equal to or greater than the predetermined value.

9. The vehicle driving assist system according to claim 5, wherein:
the condition recognition device detects a relative velocity and a distance between the subject vehicle and a preceding vehicle and a velocity of the subject vehicle as the traveling environment, and
the reactive force application device calculates the target reactive force based upon the relative velocity, the vehicle distance and the subject vehicle velocity detected by the condition recognition device.

10. The vehicle driving assist system according to claim 6, wherein:
the condition recognition device detects a relative velocity and a distance between the subject vehicle and a preceding vehicle and a velocity of the subject vehicle as the traveling environment, and
the reactive force application device calculates the target reactive force based upon the relative velocity, the vehicle distance and the subject vehicle velocity detected by the condition recognition device.

11. The vehicle driving assist system according to claim 5, wherein:
the reactive force variation device adds the additional force to the target reactive force over a predetermined time period.

12. The vehicle driving assist system according to claim 6, wherein:
the reactive force variation device adds the additional force to the target reactive force over a predetermined time period.

13. The vehicle driving assist system according to claim 1, wherein:
the operation device is an accelerator pedal and
the reactive force application device applies the reactive force to the accelerator pedal.

14. The system of claim 1, wherein the reactive force variation device adjusts the applied reactive force for a period of time, to convey information related to the discontinuous condition change to the driver of the subject vehicle via the operation device.

15. The system of claim 1, wherein the driver directly issues the travel command for operating the subject vehicle directly through the operation device, not by way of other intervening devices.

16. A vehicle comprising:
an operation device through which a travel command for controlling an operation of the vehicle is issued by a driver of the vehicle;
a condition recognition device that detects a traveling environment that is external to and around the vehicle;
a reactive force application device that applies a reactive force to the driver via the operation device in conformance to the traveling environment;
a condition change detection device that detects condition changes occurring in the traveling environment; and
a reactive force variation device that adjusts the reactive force applied by the reactive force application device in a period of time, when the condition change detection device detects a condition change in the traveling environment that is discontinuous, the discontinuous condition change being an introduction of an obstacle into the traveling environment.

17. The vehicle of claim 16, wherein the reactive force variation device adjusts the applied reactive force for a period of time, to convey information related to the discontinuous condition change to the driver of the vehicle via the operation device.

18. The vehicle of claim 16, wherein the driver directly issues the travel command for operating the subject vehicle directly through the operation device, not by way of other intervening devices.

19. A vehicle driving assist method comprising:
detecting a traveling environment that is external to and around a subject vehicle;
applying a reactive force in conformance to and the traveling environment to a driver of the vehicle via an operation device thorough which a travel command for controlling an operation of the subject vehicle is issued by the driver;
detecting a condition change occurring around the subject vehicle; and
adjusting the reactive force applied to the operation device in a period of time, when a discontinuous condition change is detected in the traveling environment, the discontinuous condition change being an introduction of an obstacle into the traveling environment.

20. The method of claim 19, wherein the driver directly issues the travel command for operating the subject vehicle directly through the operation device, not by way of other intervening devices.

21. A vehicle driving assist system comprising:
a condition recognition means for detecting a traveling environment that is external to and around a subject vehicle;
a reactive force application means for applying a reactive force in conformance to the traveling environment to a driver of the subject vehicle via an operation means for issuing a travel command to operate the subject vehicle by the driver;
a condition change detection means for detecting condition changes occurring in the traveling environment detected by the condition recognition means; and
a reactive force variation means for adjusting the reactive force applied by the reactive force application means for a period of time, when the condition change detection means detects a condition change in the traveling environment that is discontinuous, the discontinuous change being an introduction of an obstacle into the traveling environment.

22. The system of claim 21, wherein the driver directly issues the travel command for operating the subject vehicle directly through the operation device, not by way of other intervening devices.

23. The system of claim 21, wherein the reactive force variation means adjusts the applied reactive force for a period of time, to convey information related to the discontinuous condition change to the driver of the subject vehicle via the operation means.

24. A vehicle driving assist system comprising:
a condition recognition device that detects a traveling environment that is external to and around a subject vehicle;
a reactive force application device that applies a reactive force, in conformance to the traveling environment, to a driver of the subject vehicle via an operation device through which a travel command for controlling an operation of the subject vehicle is issued by the driver;
a condition change detection device that detects a condition change occurring in the traveling environment; and
a reactive force variation device that adjusts the reactive force applied by the reactive force application device in a period of time, so as to notify a driver that detection by the condition recognition device has begun or that a detection target by the condition recognition device has changed, when the condition change detection device detects a condition change in the traveling environment that is discontinuous, the discontinuous condition change being an introduction of an obstacle into the traveling environment, wherein
when the condition change in the traveling environment is continuous, the reactive force application device applies a target reactive force to the operation device, in accordance with the traveling environment, and (b) when the condition change in the environment is discontinuous, the reactive force application device applies an additional reactive force, which is determined by the reactive force variation device, for notifying the driver of a discontinuous change in the traveling environment to the operation device for a short period of time, in addition to the target reactive force.

25. The vehicle of claim 24, wherein the driver directly issues the travel command for operating the subject vehicle directly through the operation device, not by way of other intervening devices.

* * * * *